United States Patent [19]

Yabe et al.

[11] 4,194,090
[45] Mar. 18, 1980

[54] DECENTRALIZED-CONTROL TYPE ELECTRONIC SWITCHING SYSTEM

[75] Inventors: Hideo Yabe; Shohei Sato, both of Tokyo, Japan

[73] Assignee: Nippon Electric Co., Ltd., Tokyo, Japan

[21] Appl. No.: 938,740

[22] Filed: Aug. 31, 1978

Related U.S. Application Data

[63] Continuation-in-part of Ser. No. 854,968, Nov. 25, 1977, abandoned.

[30] Foreign Application Priority Data

Nov. 27, 1976 [JP] Japan .................... 51/142607

[51] Int. Cl.² ........................... H04Q 3/54
[52] U.S. Cl. ................................. 179/18 ES
[58] Field of Search ................... 179/18 ES

[56] References Cited

U.S. PATENT DOCUMENTS

| 3,974,343 | 8/1976 | Cheney et al. | 179/18 ES |
| 4,074,072 | 2/1978 | Christensen et al. | 179/18 ES X |

FOREIGN PATENT DOCUMENTS

| 2502516 | 7/1975 | Fed. Rep. of Germany | 179/18 ES |
| 1441613 | 7/1976 | United Kingdom | 179/18 ES |

*Primary Examiner*—Thomas W. Brown
*Attorney, Agent, or Firm*—Sughrue, Rothwell, Mion, Zinn and Macpeak

[57] ABSTRACT

A decentralized control-type electronic switching system having at least one signal processor, at least one call processor and at least one switch processor is disclosed. The signal processor accommodates a plurality of communications lines for receiving, storing and analyzing a line signal and a register signal sent from the communication lines and transmits a line signal and a register signal to the communication lines and stores an idle or busy state of the communication lines. The call determines the signal processor which accommodates an outgoing line to be connected to an incoming line on the basis of a signal received from the signal processor via the incoming line. The switch processor stores an idle or a busy state of links in a switch network and responds to a request from another processor for seeking an idol path between two communication lines designated by the request. A common system bus carries out data transfer between the respective processors, and an oscillator generates the system clock pulses to be used for controlling the data transfer. Each of the processors includes a system clock counter for controlling a sequence of data transmission onto the system bus. The counter is set to an initial value upon starting of the switching system and is thereafter stepped in synchronism with the system clock pulses. An inhibit circuit is operable when one processor is ready to transfer data to another processor for inhibiting the feeding of system clock pulses to the system clock counters of the several processors.

3 Claims, 13 Drawing Figures

LETTER FORMAT

FIG 6

| R63 ~ R60 | RECEIVING PROCESSOR NUMBER |
|---|---|
| R59 ~ R56 | INCOMING SIDE SIGNAL PROCESSOR NUMBER |
| R55 ~ R48 | INCOMING TRUNK NUMBER |
| R47 ~ R44 | SIGNAL CODE HEAD |
| R43 ~ R0 | INFORMATION AREA |

LETTER FORMAT

| SIGNAL CODE HEAD | SIGNAL | INFORMATION AREA | |
|---|---|---|---|
| 0 0 0 1 | SEIZING 1 | R43 ~ R40 | ICT CLASS |
| 0 0 1 0 | SEIZING 2 | R39 ~ R0 | RECEIVED DIGITS |
| 0 0 1 1 | SEIZING 3 | R43 ~ R40 | CALL PROCESSOR NUMBER |
| 0 1 0 0 | SEIZING 4 | R39 ~ R32 | ROUTE NUMBER |
|  |  | R31 ~ R0 | SENDING DIGITS |
| 0 1 0 1 | SW DRIVE REQUEST |  |  |
| 0 1 1 0 | SW DRIVE OK |  |  |
| 0 1 1 1 | ANSWER | R43 ~ R40 | OUTGOING SIDE SIGNAL PROCESSOR NUMBER |
| 1 0 0 0 | CLEAR BACK |  |  |
| 1 0 0 1 | CLEAR FORWARD | R39 ~ R32 | OGT NUMBER |
| 1 0 1 0 | SW RELEASE REQUEST |  |  |
| 1 0 1 1 | SW RELEASE OK |  |  |
| 1 1 0 0 | BUSY/REQUEST REJECT | R43 ~ R40 | OUTGOING SIDE SIGNAL PROCESSOR NUMBER |
|  |  | R39 ~ R32 | OGT NUMBER |
|  |  | R31 ~ R28 | BUSY CONTENTS |
|  |  | 0 0 0 1 | TRUNK BUSY |
|  |  | 0 0 1 0 | SW PATH BUSY |
|  |  | 0 0 1 1 | SW DRIVE NUMBER OK |
|  |  | 0 1 0 0 | SW RELEASE NUMBER OK |
|  |  | 0 1 0 1 | BUSY SIGNAL SENT FROM SUCCEDING EXCHANGE |
| 1 1 0 1 | SYSTEM OPERATION |  |  |
| 1 1 1 0 | AND MAINTENANCE |  |  |
| 1 1 1 1 | SIGNAL |  |  |

FIG 7A
FLOW CHART FOR
INCOMING CALL PROCESSOR
(LINE SCAN PART)

FIG 7F
FLOW CHART FOR OUTGOING SIGNAL PROCESSOR (LINE SCAN PART)

*1 THIS IS SENT TO THE CALL PROCESSOR
*2 THIS IS SENT TO THE INCOMING SIGNAL PROCESSOR

FIG 8

DECENTRALIZED-CONTROL TYPE ELECTRONIC SWITCHING SYSTEM

CROSS-REFERENCE TO RELATED APPLICATION

This application is a continuation-in-part application of our copending application Ser. No. 854,968, filed Nov. 25, 1977 now abandoned.

BACKGROUND OF THE INVENTION

The present invention relates to a stored-program-control switching system and, more particularly, to a decentralized control-type switching system.

Electronic switching systems are generally classified into two types --that is, a centralized control-type and a decentralized control-type. The centralized control-type electronic switching system is, by way of example, disclosed in an article by Masaya Yamauchi, et al., entitled "D-10 Electronic Switching System," in the technical journal *Japan Telecommunications Review*, July 1971. This switching system is composed of speech path equipment, including switching network, trunk circuit, etc. and central processor to control the speech path equipment, and data of each circuit in the speech path equipment as processed respectively in different means in the central processor.

On the other hand, the decentralized control-type electronic switching system is, by way of example, disclosed in an article by Mats Eklund, et al., entitled "AXE10-System Description," in the technical journal *Ericsson Review*, No. 2, 1976. The switching system is characterized by a hierarchic division into switching hardware, regional processors and central processors. The control system for the switching system is composed of a regional processor for controlling a speech path switch, another regional processor for controlling a trunk unit, still another regional processor for controlling subscribers' circuits and subscriber concentrating switches, and duplicated central processors, and the data transfer between these plurality of regional processors and one central processor is carried out under the control of the central processor.

However, the above-mentioned centralized-type electronic switching system and decentralized-type electronic switching system had the following shortcomings. Firstly, upon introducing different signaling systems, in order to effect change or addition of a function, in said centralized control-type electronic switching system, it is necessary to execute change or addition of the program in the central processor. Consequently, the change or addition of the function results in effects upon every place in the switching system. Furthermore, in the decentralized control-type electronic switching system also, a plurality of kinds of functions must be achieved in one processor such that processings pertinent to a plurality of signaling systems are carried out in each regional processor or in the central processor, and, therefore, although change or addition of one block of functions can be achieved in each processor, the change or addition would affect a plurality of kinds of functions so that the change or addition of a program was difficult. Secondly, in either type of the above-mentioned switching systems, since the overall control is managed by a single central processor, the central processor must be of highly excellent performance. Thirdly, in either type of the abovereferenced switching systems, since connection and processing of a communication call are effected by means of a single central processor, there is a limit to the processing capability and the expansibility is poor. Fourthly, in either type of the above-mentioned switching systems, since a central processor of highly excellent performance is necessitated, the central processor occupies a large weight of the switching system, especially in the case of a small-sized switching system, and thus, the switching system is uneconomical.

SUMMARY OF THE INVENTION

According to the present invention, a switching function is divided along a flow of control for a communication call, and processors are provided for the respective divided function blocks. In addition, for the respective signaling systems, there are provided different processors to make the processor absorb a different function for each signaling system. Furthermore, transfer of data among a plurality of processors is carried out through a common bus which can directly transfer data between any of the processors.

Accordingly, the present invention provides an electronic telephone switching system in which a special burden, such as relay for data transfer, is not imposed upon any particular processor, and in which the shortcomings in the prior art can be eliminated by dividing one function into groups, depending upon capabilities of the respective processors, and providing corresponding processors for the respective groups to share the load.

In addition, the present invention provides an electronic switching system in which introduction of different signaling systems, or change or addition, such as change of constructions or functions or addition of functions within each functional block or addition of a new functional block, can be effected only within the corresponding functional block, and so, change of functions and addition of functions can be easily achieved.

Still further, the present invention provides an electronic switching system in which the respective processors do not require a higher processing capacity because the functions are decentralized. The expansibility of the capability can be enhanced because the limit of the overall capability of the switching system depends only upon the data transfer capability of the common bus, and economy can be established, especially in the case of a small-sized switching system, by employing economical processors.

The subject matter of the present invention is a decentralized control-type electronic switching system comprising a plurality of processors provided separately for the different signaling systems to effect processing pertinent to line groups, each consisting of a plurality of lines and to effect transmission and reception of data to and from a common bus by employing a common data format which does not differ depending upon said signaling systems, one or more other processors for effecting control of speech path switches which do not differ depending upon said signaling systems, one or more still other processors for processing connections of a call which do not differ depending upon said signaling systems, and a common bus for directly connecting said plurality of processors to each other without requiring relay processing for data transfer.

BRIEF DESCRIPTION OF THE DRAWINGS

A more detailed description of the invention will be given hereunder referring to the accompanying drawings, in which.

DESCRIPTION OF THE PREFERRED EMBODIMENTS

Figure 1:
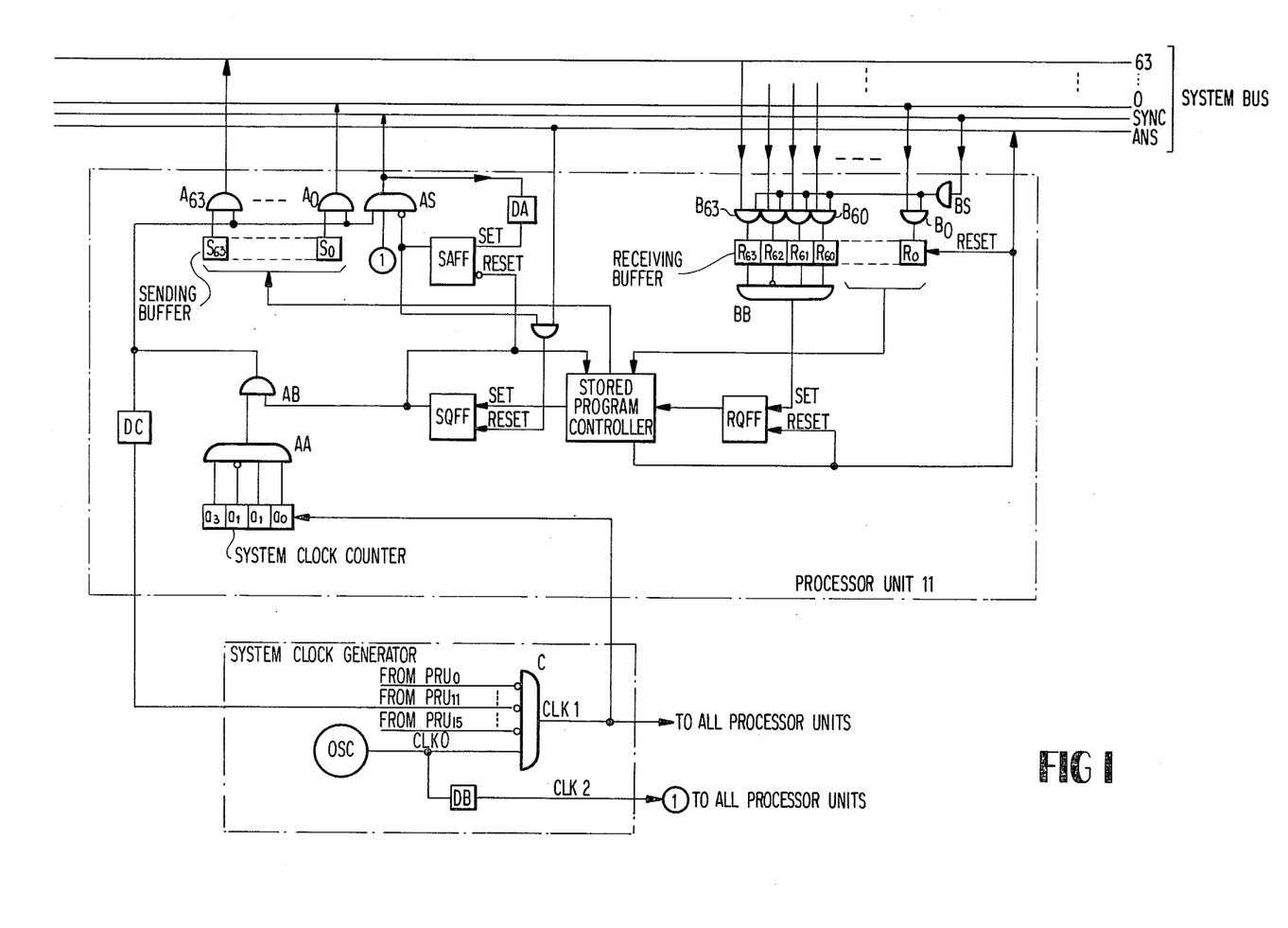
FIG. 1 is a block diagram showing a system line interface with one of a plurality of processor units in the electronic switching system according to the present invention.
Figure 2:
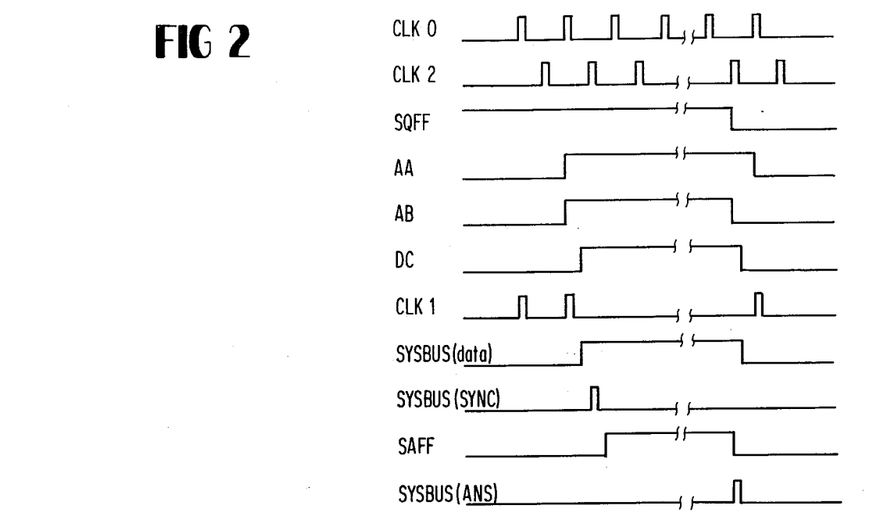
FIG. 2 is a time chart for explaining data transfer between processor units via a system bus.

First, a data transmission operation between processors will be described with reference to FIGS. 1 and 2. In FIG. 1, only one system bus is provided in the present system, and a number of processors are connected thereto. In the embodiment shown, the maximum number of the processors is 16, numbered 0–15, and among these processors, while only processor unit No. 11 is shown in FIG. 1, the other processor units have similar construction. A clock generator OSC contained in a system clock generator generates a clock pulse series having a period of 2 microseconds and a pulse width of 200 nanoseconds. This pulse series is inhibited in an AND circuit C by an output of a delay circuit DC during a period when one processor unit (for example, the processor unit No. 11) is carrying out data transmission. When none of the processors is carrying out data transmission, this pulse series is fed to the respective processors as a clock CLK 1. A system clock counter contained in a processor unit is stepped by the clock CLK 1. When the count in the counter coincides with a processor number (in the example shown in FIG. 1, "decimal 11," that is, "binary 1011"), the output of AND circuit AA is turned to "1", and if the output of flip-flop SQFF is "1", then the output of AND circuit AB is also turned to "1". Reference symbol DC designates a dalay circuit having a delay time of 200 nanoseconds, and if the output of the delay circuit DC is "1", the clock CLK 1 is suppressed at and AND circuit C. When the flip-flop SQFF is "1", data of 64 bits have been preliminarily fed from a stored program controller (SPC) to a sending buffer and stored therein so that when the output of the AND circuit AB has been turned to "1", the data of 64 bits are transmitted onto a system bus 0–63. On the other hand, in the system clock generator, the output of the clock generator OSC is fed to the respective processors as a clock CLK 2 via another delay circuit DB having a delay time of 1 microsecond. Under the AND condition of the output of the AND circuit AB and the clock CLK 2, a sampling pulse for the above-mentioned 64-bit data is transmitted from AND circuit AS onto a SYNC bus. The output of the AND circuit AS is delayed by about 100 nanoseconds by a delay circuit DA and then sets a flip-flop SAFF. Once the flip-flop SAFF is set, the subsequent output from the AND circuit AS is inhibited. When a processor on a receiver side has accepted the received data, it transmits an ANS pulse onto an ANS bus. The flip-flop SQFF in the processor on the transmitter side is reset in response to reception of the ANS pulse, and in response to the reset of the flip-flop SQFF, the flip-flop SAFF in reset.

The stored program controller (SPC) is preferably composed of a μPD8080A microprocessor manufactured by Nippon Electric Company, Ltd. This is a complete 8-bit parallel processor fabricated on a single LSI chip containing six 8-bit data registers, an 8-bit accumulator, four testable flag bits, and an 8-bit parallel binary arithmetic unit. The μPD8080A microprocessor utilizes a 16-bit address bus to directly address 64K bytes of memory. More detailed information may be had by reference to NEC specification sheet SP8080A-8-76.

Next, the operation of data transfer and reception between processors will be described. Each processor unit stores the data bits 0–63 on the data bus into a receiving buffer in response to a sampling pulse on the SYNC bus. The most significant 4 bits in the receiving buffer $R_{63}$-$R_{60}$ represent a receiving processor number, and if they coincide with the assigned processor number (in the example shown in FIG. 1, "binary 1011"), the output of AND circuit BB is turned to "1", thereby resetting flip-flop RQFF. When the flip-flop RQFF has been set, an interrupt signal is sent to the SPC. The SPC interrupts the processing which has been executed so far in response to reception of the interrupt signal, and after it has accepted the contents of the receiving buffer $R_{59}$-$R_0$, it transmits a reset pulse to the flip-flop RQFF, the receiving buffer and the ANS bus. Thereafter, the interrupted processing is recommenced.

Figure 3:
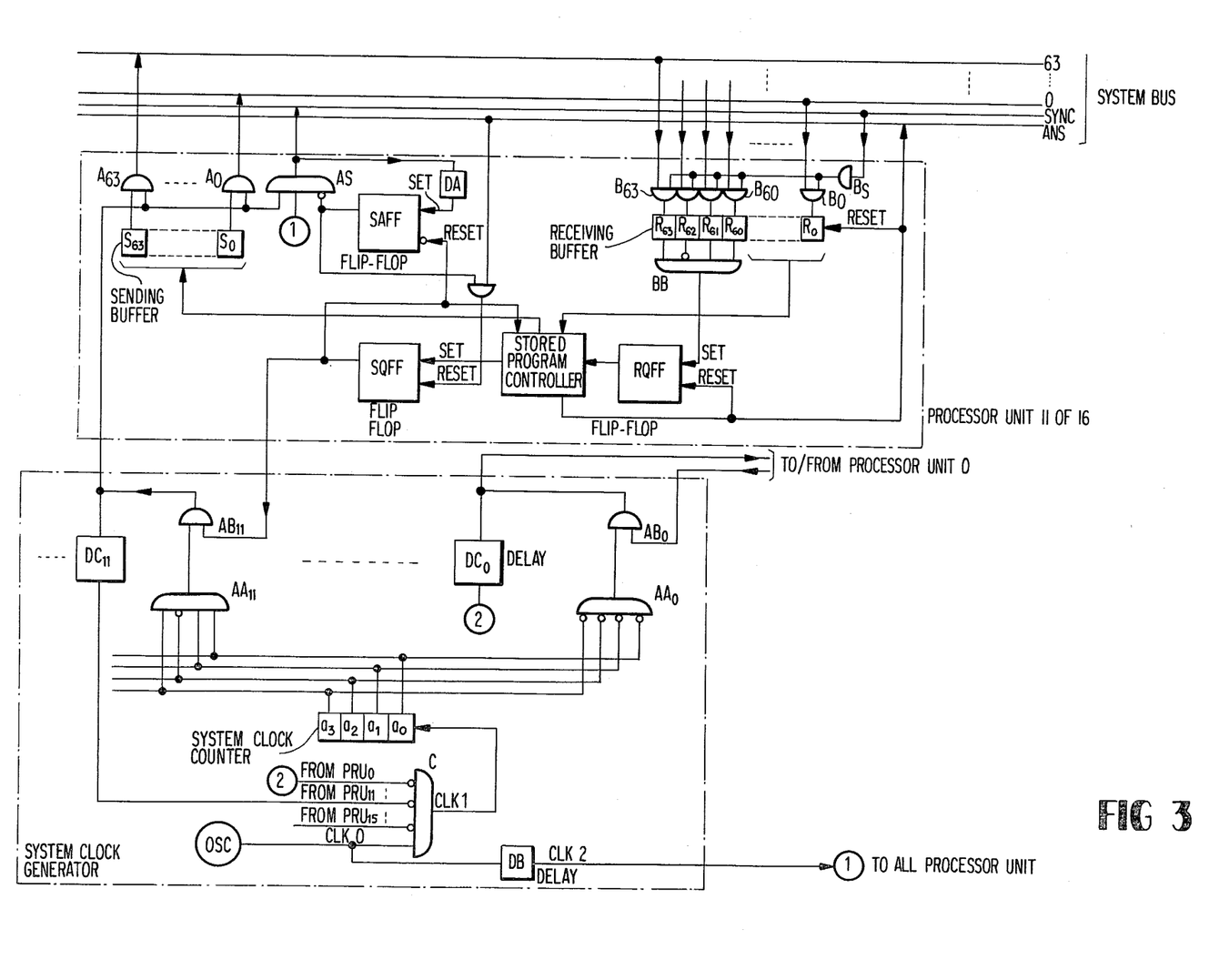
FIG. 3 is a block diagram showing a system clock counter in the electronic switching system recording to an alternative embodiment of the system line interface with a processor unit.

Though a system clock counter is provided in each processor unit in the preferred embodiment, modification can be made such that only one counter is provided in the entire system as shown in FIG. 3. When one processor intends to transmit data onto the system bus, it sends a transmission request signal to the system clock counter, which stops stepping when its count indicates the number of said one processor and sends a transmission allowance signal back to said processor. After the transmission allowance signal has been received by said processor, the processor transmits data onto the system bus. After completion of the transmission, the processor interrupts the transmission request signal, and the system clock counter detects the interruption of the transmission request signal from said processor and recommences its stepping, and in this manner, data transfer is effected between processors.

Figure 4:
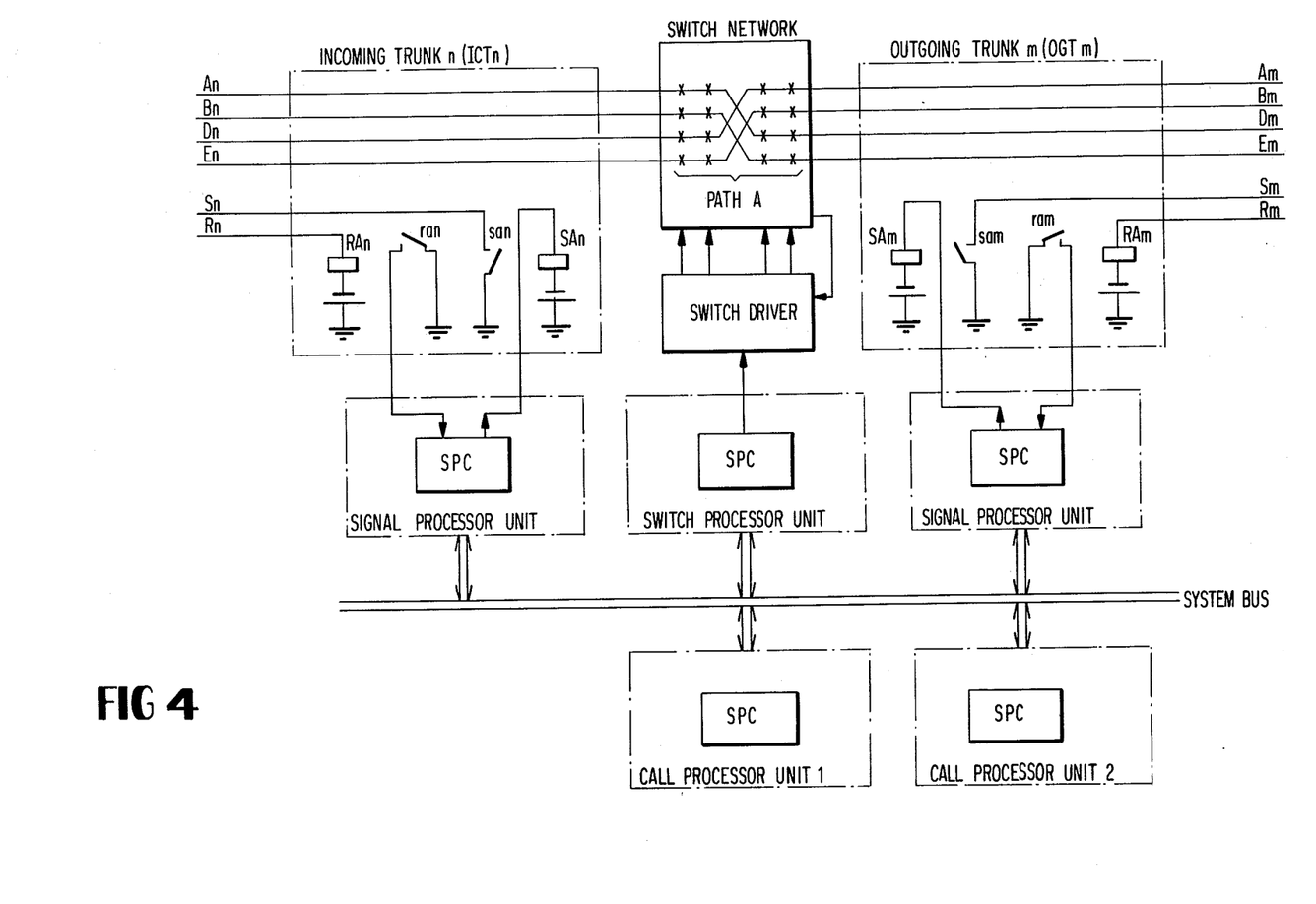
FIG. 4 is a system block diagram for explaining switching operations in the electronic switching system according to the present invention.
Figure 5:
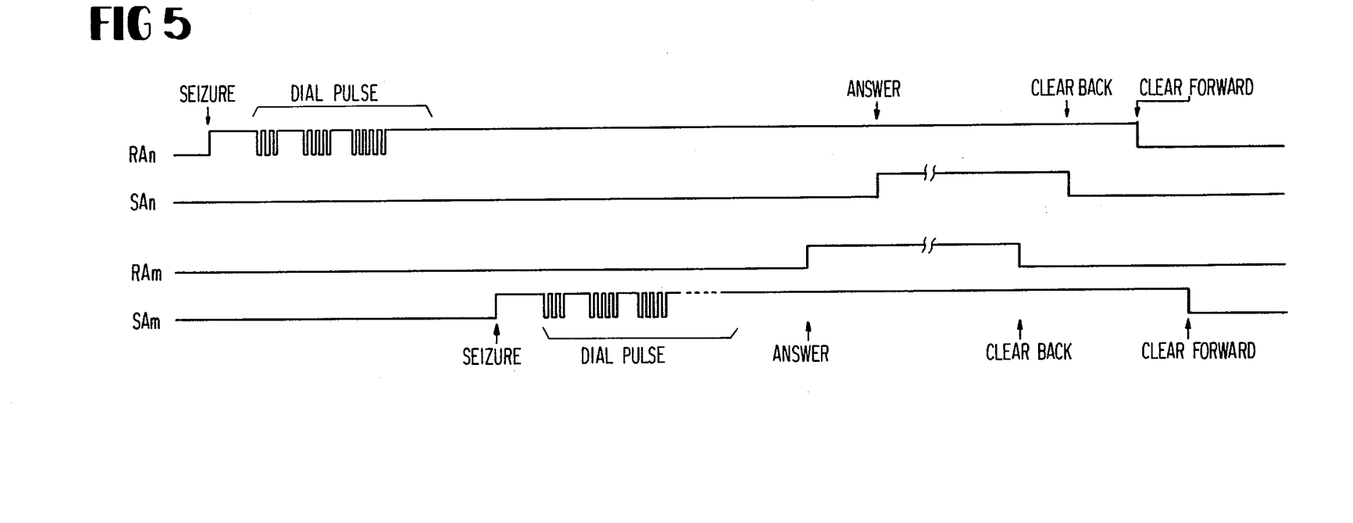
FIG. 5 is a time chart representing transmission and reception of signals to and from another switching office.
Figure 6:
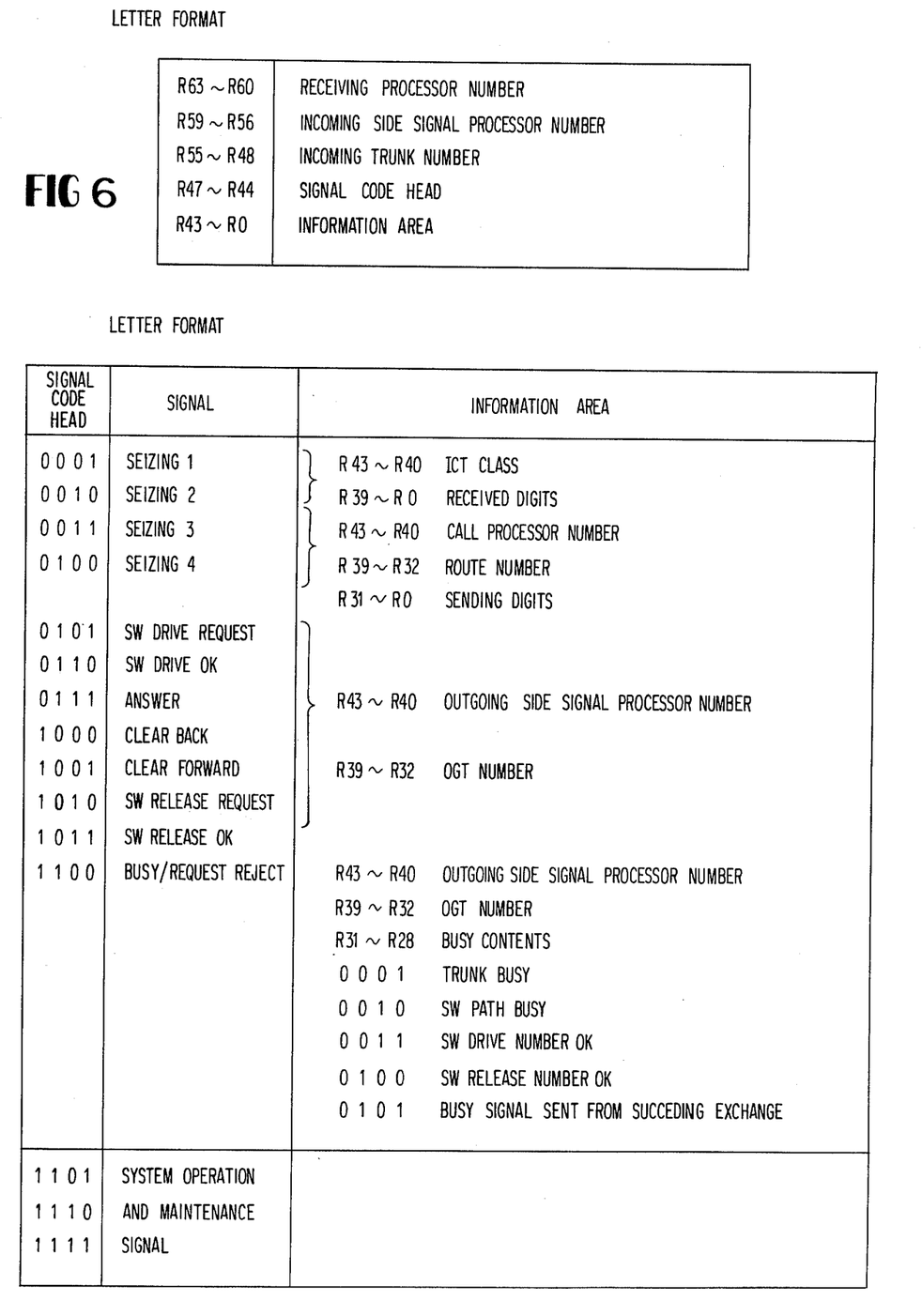
FIG. 6 shows one example of a format of data transmitted and received via a system bus between processor units.

Now, switching operations in a tandem switching system will be described with reference to FIGS. 4, 5, 6 and 7A–7F. In FIG. 4, reference symbols ICTn and OGTm designate incoming and outgoing trunk circuits, respectively, for an E&M signaling system, which transmit and receive line signals and register signals to and from the other switching office through an S-wire and an R-wire. An E&M signaling system is a telephone line signaling system generally for the link between trunk equipment of the telephone switching system and transmission carrier equipment. Signals are transferred between the trunk equipment and the transmission carrier equipment over leads designated in the industry as "E" and "M". The "M" lead transmits to the transmission carrier equipment, and the "E" lead transmits to the trunk equipment. A detailed description of E&M signaling is set forth in paragraphs 4.03-4.12 in section 5 of "Notes on Distance Dialing," published by the American Telephone and Telegraph Company, Engineer and Network Services Department, Systems Planning Section, in 1975. A switch network achieves exchange connections between speech wires (A, B, C and D) of any ICT and any OGT, and it consists of a 4-stage link construction. Speech paths within the switch network are connected and disconnected by a switch driver which has received a command from a stored program controller contained in a switch processor unit. One block of data transmitted and received between the illustrated processor units through the system bus is called a "letter," and one example of a format of the letter is shown in FIG. 6. The timing and sequence of the series of operations in which an incoming call from another switching office occurs at the trunk circuit ICTn, the call is connected to the trunk circuit OGTm, then speech commences, subsequently, the speech is completed and the call is disconnected, will be described herunder with particular reference to FIGS. 5, 6 and 7A-7F.

In the case that the trunk circuit ICTn is started by another switching office, at first a ground potential is sent to an Rn wire of the trunk circuit ICTn. This ground potential energizes an RAn relay as shown in FIG. 5, and, accordingly, a contact $ra_n$ (FIG. 4) is closed. An incoming side signal processor periodically (for instance, at every 96 ms) reads out the state of the $ra_n$ contact SPC, and in response to the transition of the state from an opened state to a closed state, the signal processor recognizes that the trunk circuit ICTn has been started by another switching office and that, subsequently, dial pulses will be incoming. In order to read out dial pulses, it is necessary to shorten the scanning period, and so, subsequently, the scanning is effected for the $ra_n$ contact with a scanning period of 16 milliseconds. This operation is illustrated by the flow chart in FIG. 7A. Owing to this scanning period of 16 milliseconds, the incoming side signal processor can read out the changes of close to open and open to close of the $ra_n$ contact caused by dial pulses. Then, as shown by the flow chart in FIG. 7B, the signal processor transmits the received digits to a call processor unit 1, which has been preliminarily allotted to the trunk circuit ICTn via the system bus, by making use of the signal "seizing 1" as represented in FIG. 6.

Figure 7A:
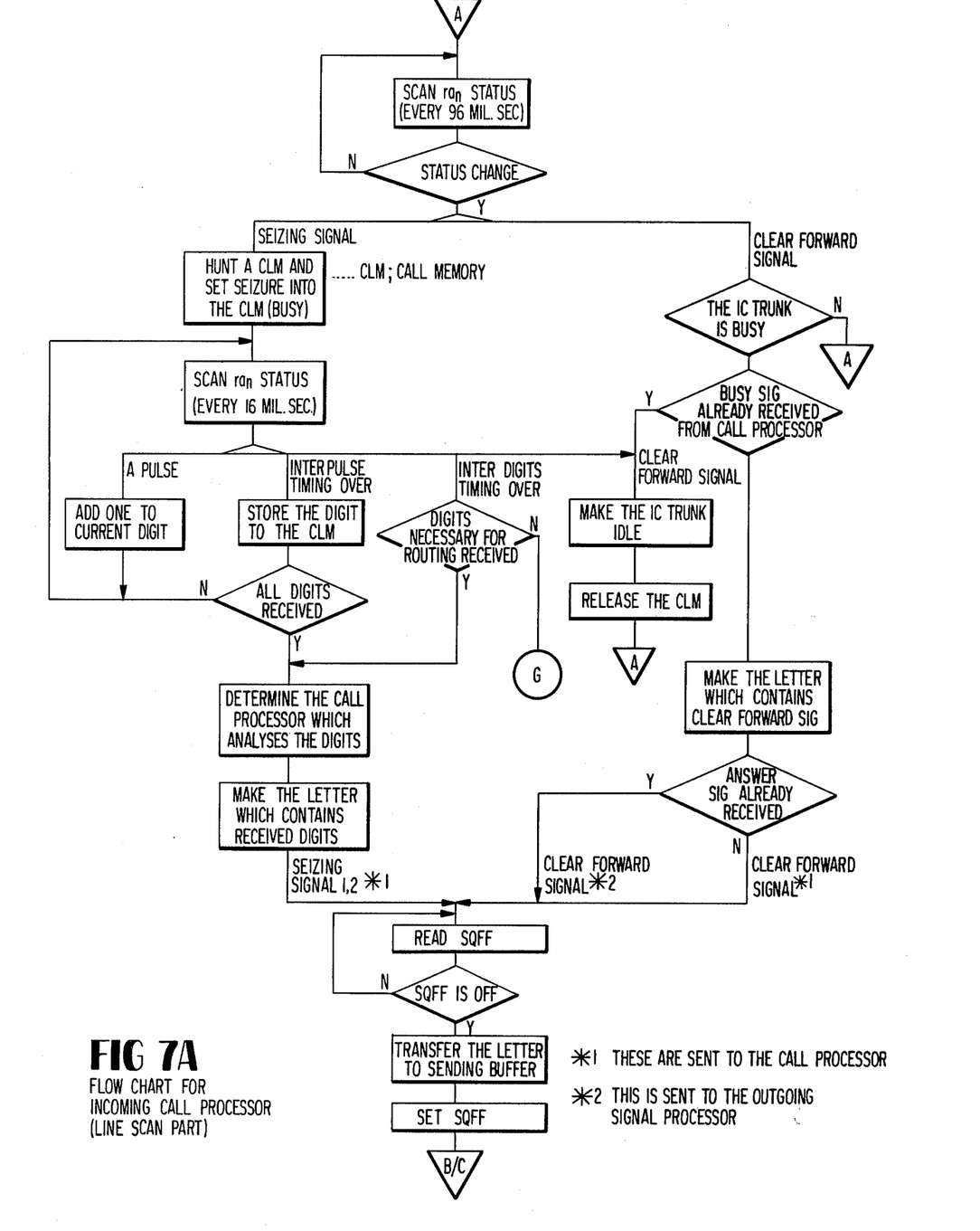
FIGS. 7A–7F are flow diagrams for the tandem switching system shown in FIG. 4.
Figure 7B:
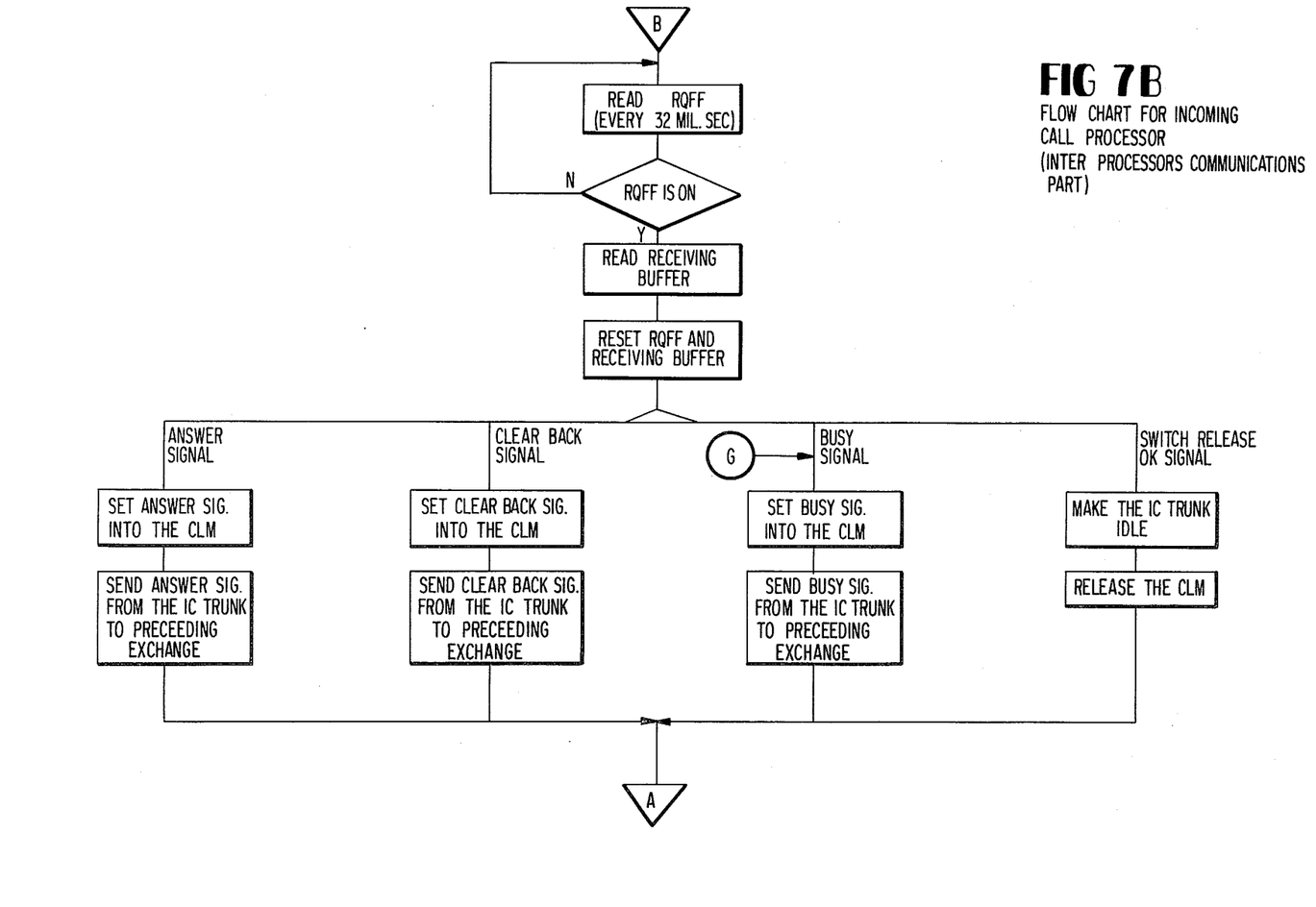
Figure 7C:
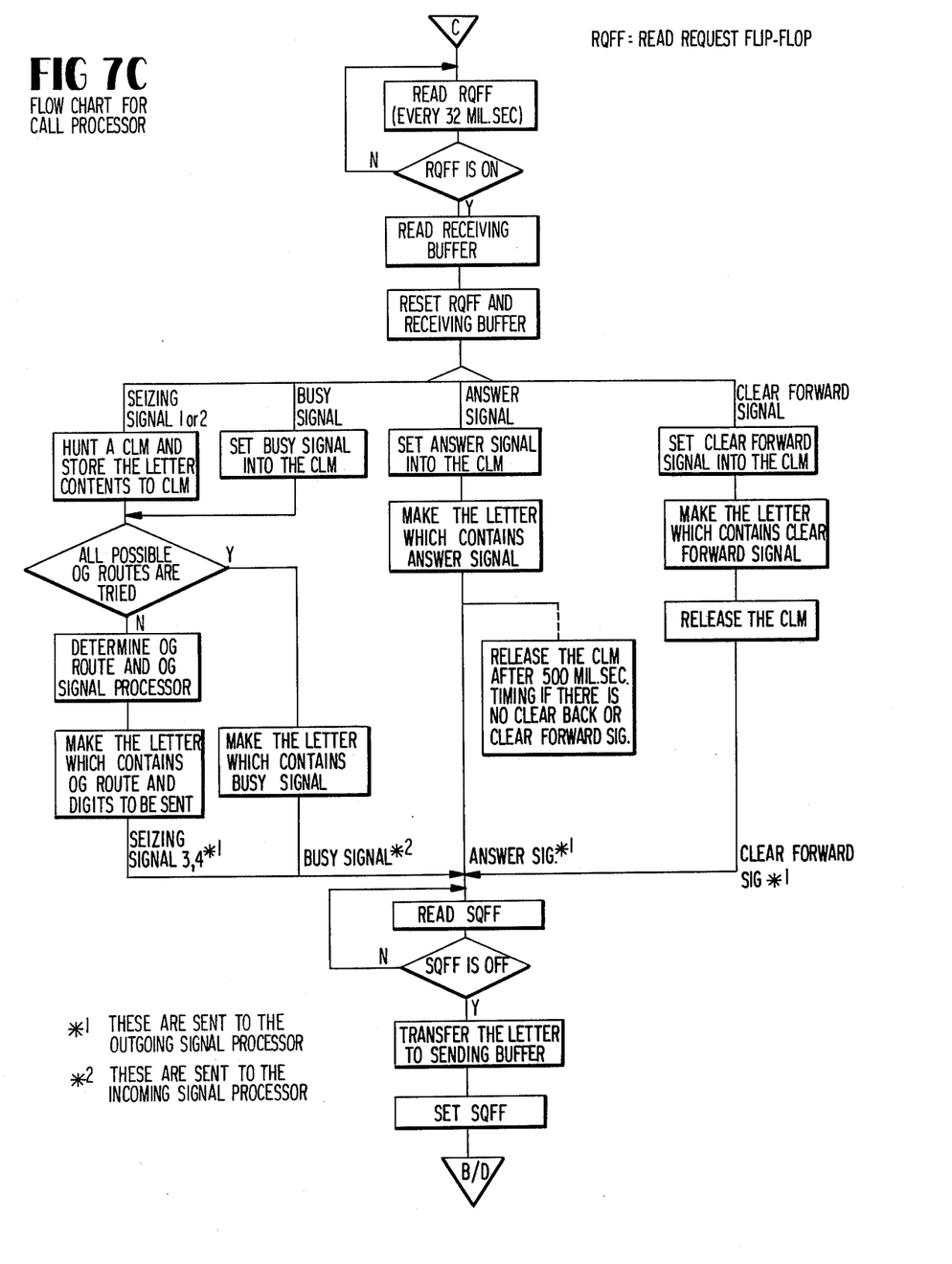

The call processor unit 1, the flow chart for which is shown in FIG. 7C, determines what outgoing route is to be used for the call by making use of a translation table stored in its own memory, and further determines in what signal processor the route is accommodated. In addition, it also determines the number of digits to be transmitted through that route. After these decisions have been made, a letter of "seizing 3" shown in FIG. 6 is transmitted to an outgoing side signal processor via the system bus.

Figure 7D:
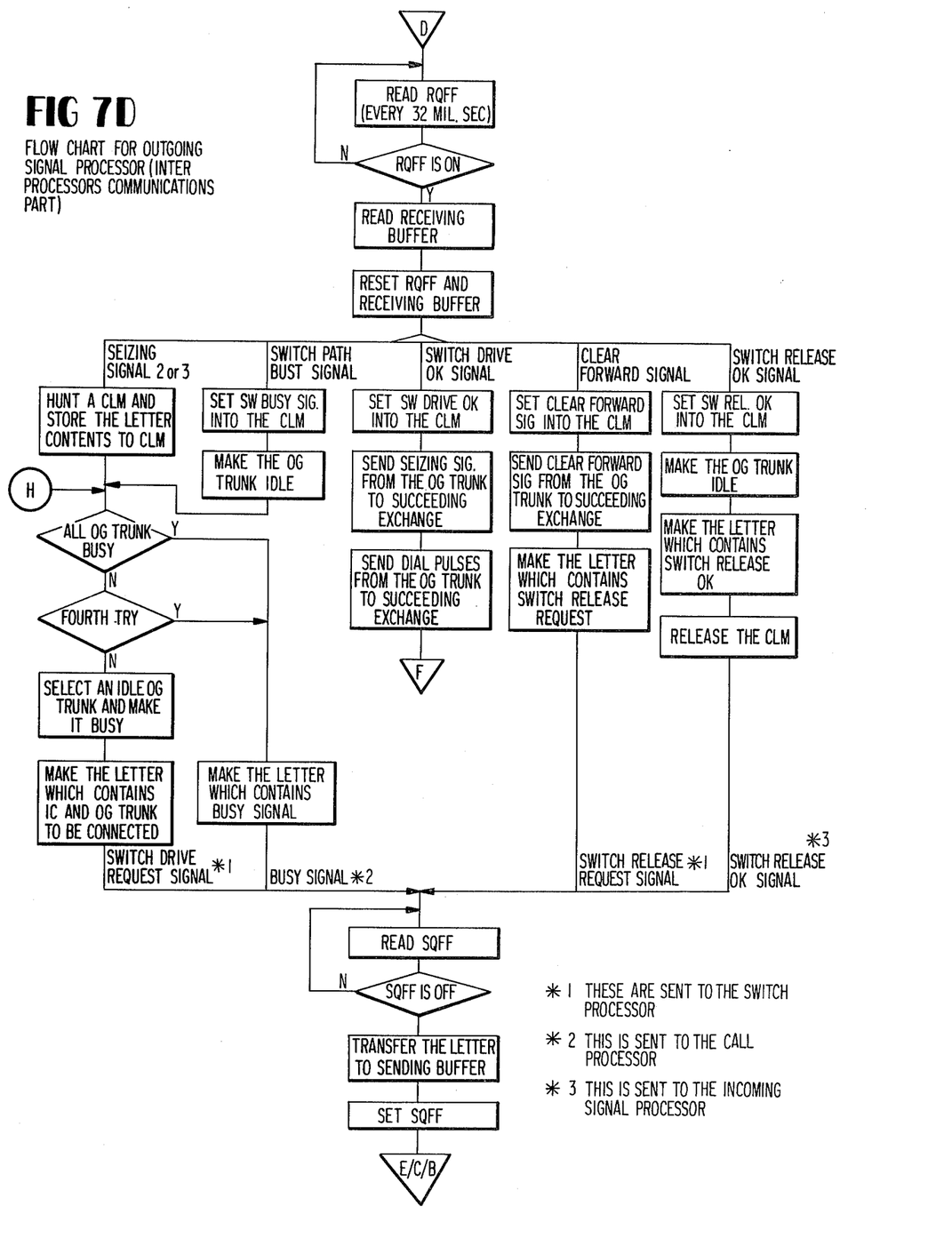

As shown in FIG. 7D, the outgoing side signal processor which has received this letter makes a search on a busy/idle map in its own memory whether or not an idle line exists in the route designated by the route number, and if it exists, the signal processor marks the idle line to be busy in the memory and, subsequently, transmits a letter of "SW drive request" shown in FIG. 6 to the switch processor via the system bus. The switch processor can find the numbers of the terminals of the switch network where the desired trunks are accommodated, on the basis of the ICT number and the OGT number contained in the received letter.

Figure 7E:
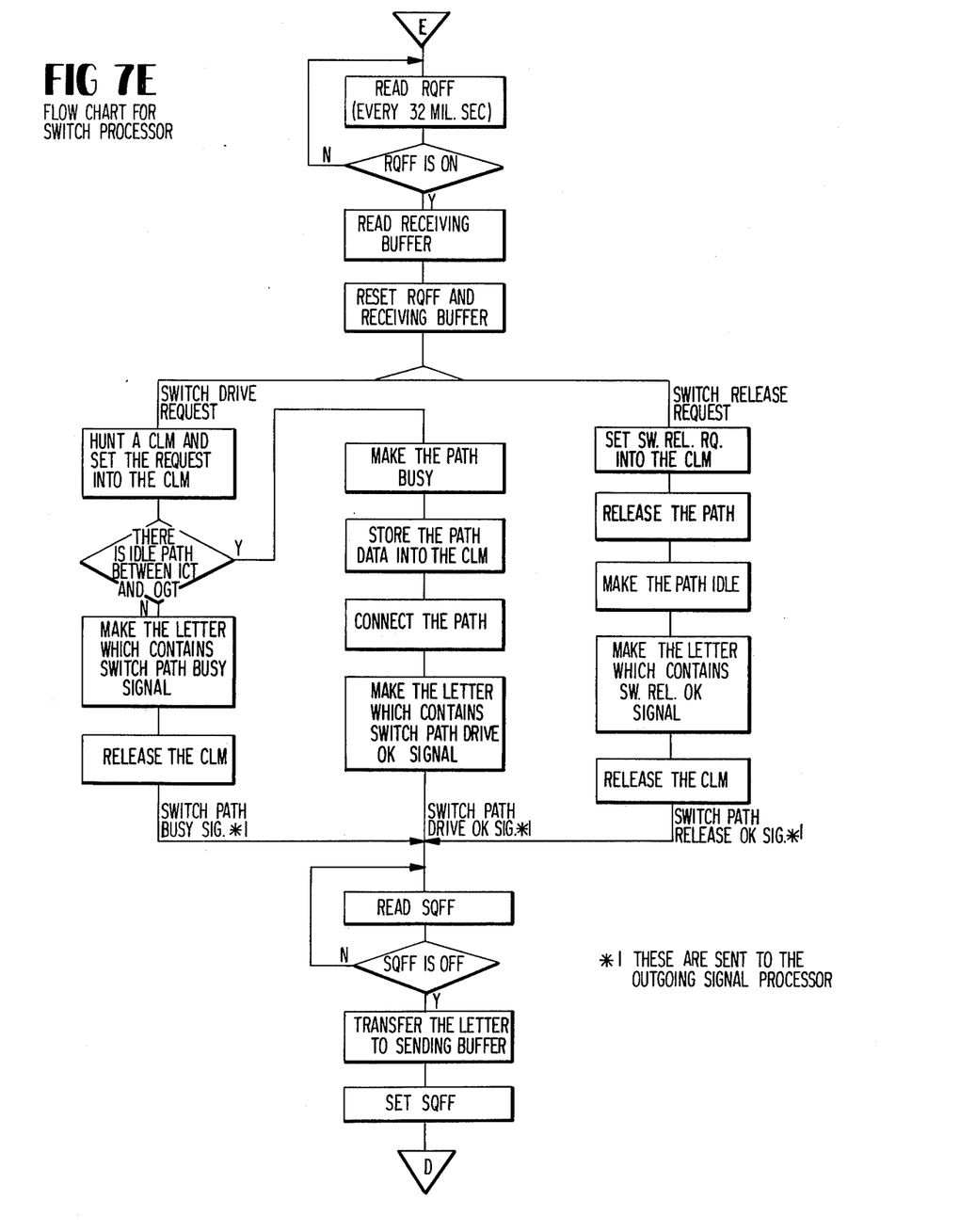

The switch processor, the flow chart for which is shown in FIG. 7E, then selects one of idle paths connecting the above-referred trunk circuits ICTn and OGTm on the basis of a busy/idle map for the links in the switch network that is stored in its own memory, remembers the selected path while marking the links forming the busy path on the map, and transmits to the switch driver an order for closing the selected path. The switch driver closes the path designated by the order and transmits a confirmation signal for the closure to the switch processor. After reception of the confirmation signal, the switch processor transmits a letter of "SW drive OK" shown in FIG. 6 to an outgoing side signal processor via the system bus.

Figure 7F:
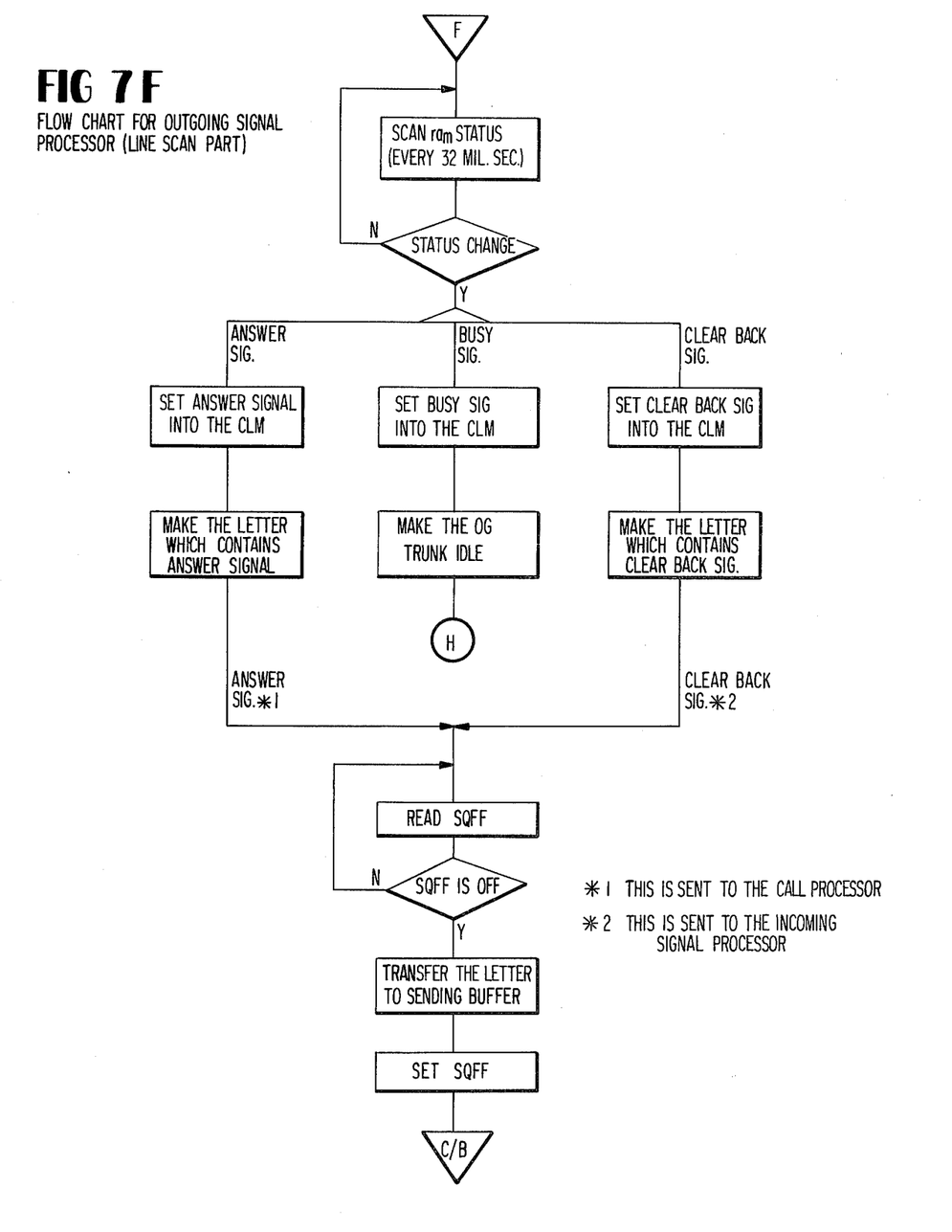

The outgoing side signal processor which has received the letter drives an SAm relay in the trunk circuit OGTm as shown in FIG. 5. Then a contact $sa_m$ (FIG. 4) is closed, resulting in transmission of a ground potential through an Sm wire, which potential serves as a starting signal for the next subsequent switching office. The outgoing side signal processor transmits the dial digits contained in the above-mentioned letter of "seizing 3" to the next subsequent switching office in the form of ON/OFF of the ground on the Sm wire. That is, the outgoing side signal processor turns the SAm relay ON/OFF by the number of times corresponding to the dial digit. When call connections in the subsequent switching offices have been completed to a called subscriber and the called subscriber has answered, an answer signal is sent back. The answer signal is sent back in the form of a ground potential on an Rm wire from the subsequent switching office. Then, as shown in FIG. 5, an RAm relay is energized to close a contact $ra_m$, and as shown in FIG. 7F, this closure is detected by the outgoing side signal processor as an answer signal. The outgoing side processor transmits a letter of "ANSWER" shown in FIG. 6 to the call processor unit 1 via the system bus.

The call processor unit 1 further transmits the letter of "ANSWER" to the incoming side processor, and, thereafter, the call processor unit 1 is released from the processing of that call. The incoming side signal processor which has received the letter "ANSWER" drives an SAn relay (as shown in FIG. 5) in the trunk circuit ICTn to transmit a ground potential onto an Sn wire. This ground potential serves as an answer signal to the preceding switching office. Thus, the call is brought into an answered state, and this state is maintained until either the calling or called subscriber becomes on-hook.

Assuming now that the called subscriber becomes on-hook earlier, a clear-back signal is generated as shown in FIG. 7B, and this signal is sent back from the subsequent switching office in the form of opened Rm wire. The outgoing side signal processor edits a letter of "clear back" shown in FIG. 6 and transmits the letter to the incoming side signal processor via the system bus. The incoming side signal processor receives this letter and, as shown in FIG. 5, interrupts the ground potential on the Sn wire by releasing the SAn relay, and thereby a clear-back signal is transmitted to the preceding switching office.

When the calling subscriber becomes on-hook, a clear-forward signal is generated, and this signal is transmitted from the preceding switching office in the form of opened Sn wire, resulting in the release of the RAn relay, as shown in FIG. 5. As shown in FIG. 7A, when the incoming side signal processor has detected the opened state of the contact ra$_n$, it edits a letter of "clear-forward" shown in FIG. 6 and transmits the letter to the outgoing side signal processor via the system bus. The outgoing side signal processor, which has received the letter of "clear-forward," interrupts the ground potential on the Sm wire by releasing the SAm relay, as shown in FIG. 5. This interruption of the ground potential serves as a clear-forward signal to the subsequent switching office. Next, as shown in FIG. 7D, the outgoing side signal processor edits a letter of "SW release request," shown in FIG. 6 and transmits the letter to the switch processor. The switch processor searches for the path between the trunk circuits ICTn and OGTm that is stored in the memory, edits a path release order for the switch driver, and transmits that order to the switch driver as shown in FIG. 7E. In response to this order, the switch driver releases the corresponding path and transmits a confirmation signal for the release to the switch processor. As shown in FIG. 7E, the switch processor edits a letter of "SW release OK" shown in FIG. 6 and transmits the letter to the outgoing side signal processor via the system bus. Upon reception of this letter, the outgoing side signal processor resets the busy/idle state of the trunk circuit OGTm stored in its memory to an idle state and also transmits the letter of "SW release OK" to the incoming side signal processor, as shown in FIG. 7D. The incoming side signal processor receives this letter and resets the busy/idle state of the trunk circuit ICTn stored in its memory to an idle state, as shown in FIG. 7B.

In the above description, the method for the use of the letters "seizing 2," "seizing 4" and "Busy/Request reject" were not explained. Therefore, the use of these letters will be described hereunder. The letters of "seizing 2" and "seizing 4" are used in case the number of the digits to be transmitted is 8 or more, "seizing 2" being used subsequently to "seizing 1," and "seizing 4" is used subsequently to "seizing 3." The letter of "Busy/Request reject" is used in case a selection request for idle resource, such as trunks, switch paths, etc., is not satisfied, and in that case, a processor having received the request sends back this letter to the requesting processor as an answer. The requesting processor which has received this letter determines, depending upon the situation of the respective cases, whether the same request is to be issued again or the call is to be processed as busy.

The letters of "system operation and maintenance signal" are used for other purposes which are not directly related to a series of call connection processings as described above. For example, they are used for the purposes of collection of traffic data, blocking of a line by a maintenance worker, change of routing patterns, etc., but a more detailed description will be omitted here because it is not directly pertinent to the subject matter of the present invention.

In the above preferred embodiment, description has been made with respect to the case where both the incoming side and outgoing side signal processors accommodate lines of the same E&M signaling system. Now, a modified embodiment which concerns the case where the signal processors accommodate lines of different signaling systems will be described with reference to the block diagram in FIG. 8.

Figure 8:
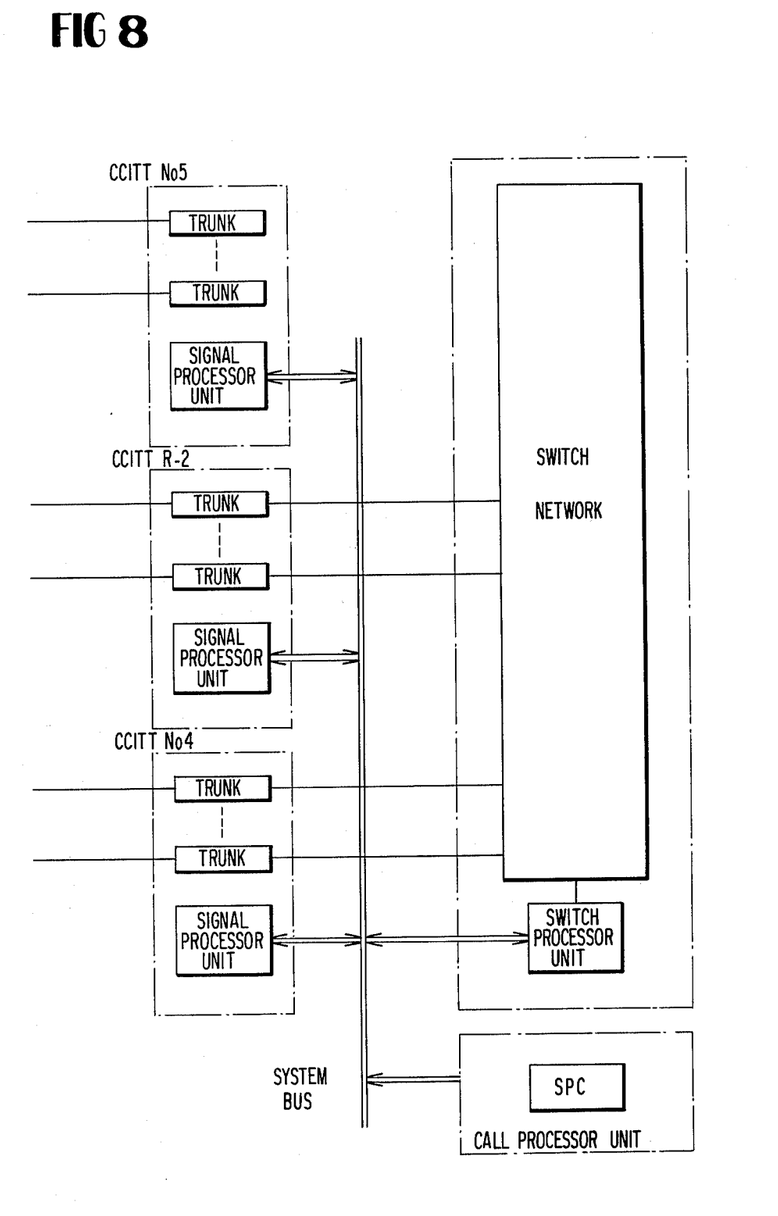
FIG. 8 is a block diagram showing another preferred embodiment of the present invention.

In this modified embodiment, with respect to the signaling systems, lines of the CCITT No. 5 signaling system, CCITT R-2 signaling system and CCITT No. 4 signaling system are accommodated, and different signal processor units are provided for the respective signaling systems. In addition, a switch network is provided for a switch processor unit. Furthermore, there is provided a call processor unit which can effect call processing for switching signals without depending upon the signaling systems, and the above-mentioned respective processors are connected to each other via a system bus.

The signal processor accommodating the CCITT No. 5 system places an MF sender/receiver under its control, and it also controls sender/receiver links for connecting respective lines to said MF sender/receiver. Likewise, the signal processors accommodating the CCITT No. 4 system and the CCITT R-2 system, respectively, are also provided with equipments adapted to the respective signal systems so that said equipments may be controlled by the corresponding signal processors. Owing to such provision, the portion of the switching signal depending upon the respective signaling systems can be absorbed to the maximum extent by the respective signal processors, and, accordingly, with respect to the letter format on the system bus, a common format can be used.

According to the present invention, the functions of the respective processors are realized independently as described above, and so a versatility for change of functions is high. For instance, in case of introducing a different configuration of switch network in place of the existing switch network, it is only necessary to change the program of the switch processor and the switch driver, and in case the function relating to digit analysis is to be modified, it is only necessary to modify the program of the call processor.

With regard to expansion of the scale of the system, although the number of processors is limited to 16 at the maximum in the embodiment disclosed, it is easy to increase the maximum number up to 256. While the maximum capacity of the system is determined by the maximum scale of the switch network and the transfer limit of the system bus, with regard to the switch network, a network of the scale necessitated in practical use can be realized in a relatively easy manner by employing a multi-stage link construction or a time-division switch, and, therefore, the practically available maximum scale of the system according to the present invention is determined only by the transfer capability of the system bus.

As described above, the present invention provides an economical and highly versatile electronic telephone switching system by dividing the switching processing functions, providing processors at the respective divided sections, and connecting said processors via a common bus to form the exchange.

We claim:

1. A decentralized control-type electronic switching system comprising:
    at least one signal processor accommodating a plurality of communication lines for receiving, storing and analyzing a line signal and a register signal sent from said communication lines, for transmitting a line signal and a register signal to said communication lines, and for storing an idle or busy state of said communication lines;
    at least one call processor for determining said signal processor which accommodates an outgoing line to be connected to an incoming line on the basis of a signal received from said signal processor via said incoming line;

at least one switch processor for storing an idle or busy state of links in a switch network, for responding to a request from another processor for seeking for an idle path between two communication lines designated by said request, for storing and connecting said path, and for responding to a request from another processor for disconnecting a path between two communication lines designated by said request;

a common system bus for carrying out data transfer between said respective processors; and an oscillator for generating system clock pulses to be used for controlling said data transfer, each of said processors including:

a system clock counter for controlling a sequence of data transmission onto said system bus, said counter being set at an initial value upon starting of said switching system and thereafter stepped in synchronism with said system clock pulses;

inhibit means operable when one processor is ready to transfer data therefrom to another processor for inhibiting the feed of the system clock pulses;

sending means for transmitting said data onto said system bus upon coincidence of the count in said system clock counter with an assigned processor number;

receiving means for receiving data from said system bus but storing the data only when an addressed processor number contained in said data coincides with an assigned processor number; and means for releasing said inhibit means to restore the feeding of the system clock pulses after the data transmission has been completed, whereby the data transfer between said processors can be accomplished.

2. A decentralized control-type electronic switching system as claimed in claim 1 wherein said system clock counter is one of a plurality provided for the entire system, that when one processor is ready to transmit data onto said system bus, said processor transmits a transmission request signal to said system clock counter which interrupts stepping of the count when the count presents the assigned processor number of said processor, as a result of which said system clock counter transmits a transmission allowance signal to said processor, said processor transmits the data onto said system bus in response to reception of said transmission allowance signal and interrupts said transmission request signal after completion of the transmission, and said system clock counter recommences the stepping of the count in response to the detection of the interruption of the transmission request signal from said one processor, whereby the data transfer between said processors can be accomplished.

3. A decentralized control-type electronic switching system as claimed in claim 1 wherein said system includes a plurality of call processors, one call processor being associated with said communication lines such that when a call is incoming from one line, a signal pertinent to said call is received by a signal processor accommodating said one line and then transmitted to a call processor being associated with the incoming line for determining an outgoing route of said call and an outgoing side signal processor accommodating said outgoing route and preliminarily associated with said incoming line, said call processor determining an outgoing side signal processor accommodating an outgoing line to be connected to said incoming line on the basis of a received called subscriber number and transmitting a starting signal containing an incoming line number and the called subscriber number to said outgoing side signal processor, said outgoing side signal processor selecting an idle outgoing line that is necessitated for said call on the basis of the received called subscriber number and transmitting a switch connection request signal containing the incoming line number and the outgoing line number to the switch processor, and said switch processor selecting and connecting an idle path between the two lines designated by said received switch connection request signal, thereby accomplishing the switching connection, whereby the number of the call processors can be increased correspondingly to the increase in the processing requirements of the switching system.

* * * * *